T. M. EYNON & J. V. SCHMID.
BLOW-OFF VALVE.
APPLICATION FILED SEPT. 8, 1911.
1,047,774.
Patented Dec. 17, 1912.
2 SHEETS—SHEET 1.
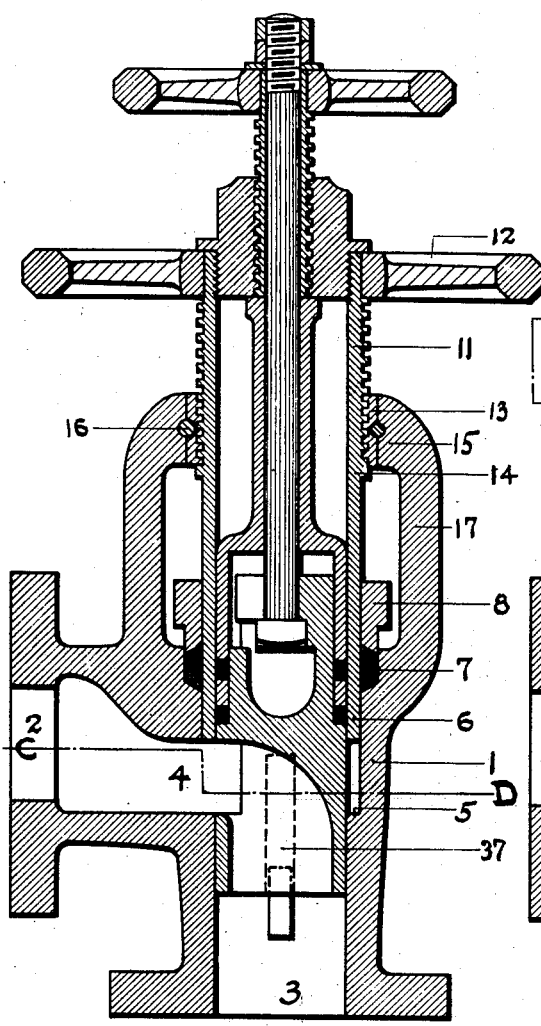
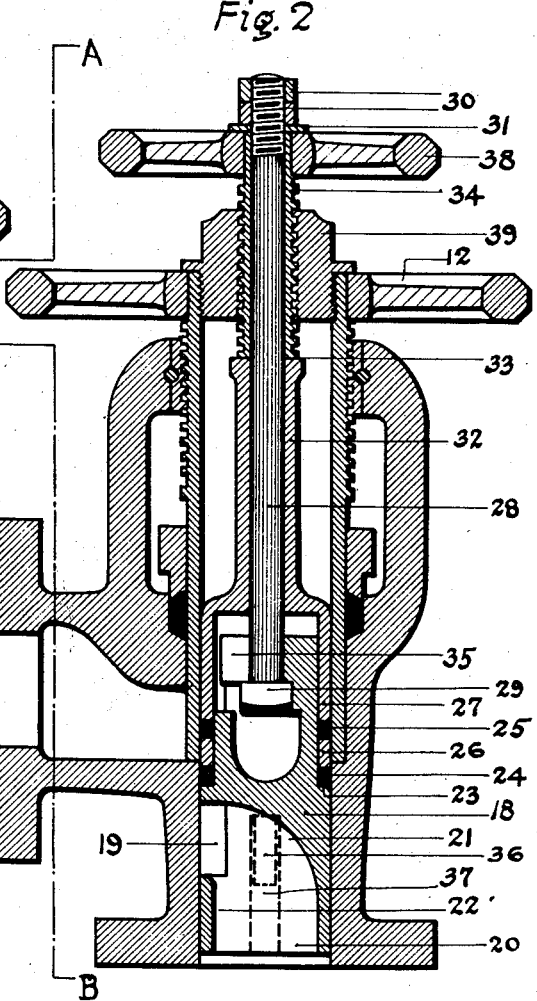

T. M. EYNON & J. V. SCHMID.
BLOW-OFF VALVE.
APPLICATION FILED SEPT. 8, 1911.
1,047,774.
Patented Dec. 17, 1912.
2 SHEETS—SHEET 2.
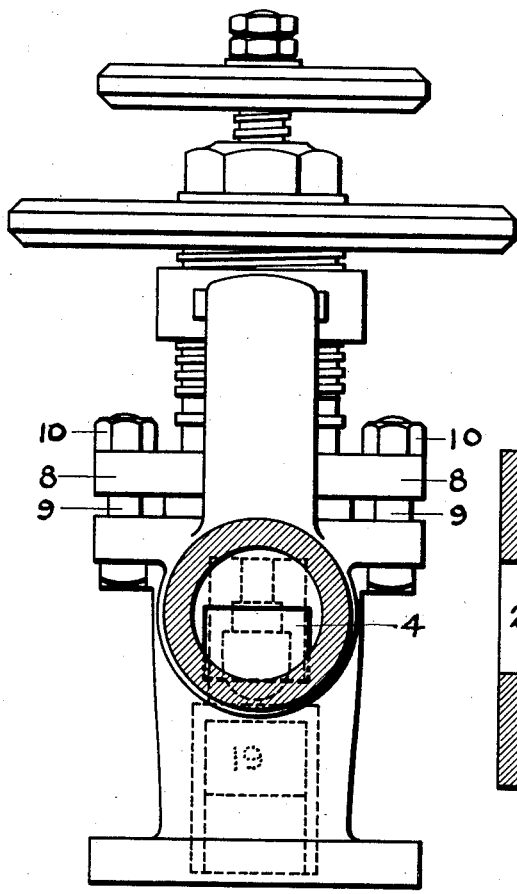
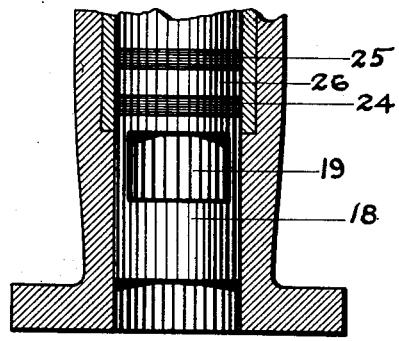
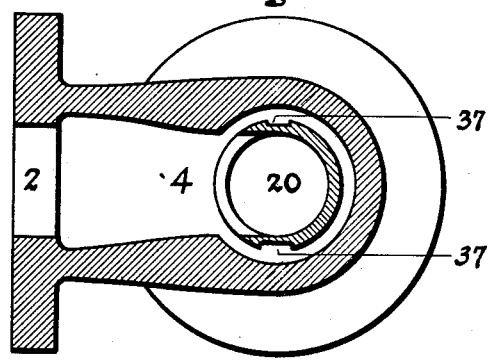
WITNESSES:
Thomas M. Eynon
and John V. Schmid
INVENTORS
BY William Steell Jackson
ATTORNEY.

UNITED STATES PATENT OFFICE.

THOMAS M. EYNON AND JOHN V. SCHMID, OF PHILADELPHIA, PENNSYLVANIA, ASSIGNORS TO THE EYNON-EVANS MFG. CO., A CORPORATION OF PENNSYLVANIA.

BLOW-OFF VALVE.

1,047,774.  Specification of Letters Patent.  Patented Dec. 17, 1912.

Application filed September 8, 1911. Serial No. 648,295.

*To all whom it may concern:*

Be it known that we, THOMAS M. EYNON and JOHN V. SCHMID, citizens of the United States, and residents of Philadelphia, Pennsylvania, have invented a certain new and useful Blow-Off Valve, of which the following is a specification.

The purpose of our invention is to support the packing of a piston valve continuously during its movement, shielding it from any transverse opening or openings.

Further purposes of our invention are to greatly increase the range of usefulness and life of a plug valve; to reduce the movement of an annularly sealing valve; to make it possible to use any desired material for the packing, while compressing it axially to expand it radially; to prevent rotation of the plug valve; to use a shield for the mechanical protection of outwardly pressed ring packing for a plug valve; to use this shield as an additional valve, protecting its seat internally by the bottom of the plug valve; to support the ring packing at all times in all directions, particularly avoiding the injury which would result if it were moved past an opening; to use a rectangular lateral opening in the valve body adjacent to the plug valve, rendered practicable by the complete and continuous support of the ring packing; to make the valve, viewed as a double seal structure, more efficient when placed in "reversed" position, with its longitudinal bore toward the boiler; and to provide for the renewal of the ring packing for a plug valve while the valve is in service.

Further purposes of our invention will be apparent to those skilled in the art, from the description and claims which follow.

We have preferred to illustrate our invention by a simple form thereof which is efficient, relatively inexpensive and eminently suited to the performance of its duty under all possible service conditions, while recognizing that part or all of the advantages of our invention may be obtained by the use of various other embodiments of our invention which will readily occur to the minds of those skilled in the art to which it appertains after receiving the disclosures herein.

Figure 1 is a longitudinal section of the preferred embodiment of our invention through the center of the inlet and outlet openings and with the valve in open position. Fig. 2 is a view corresponding to Fig. 1, but with the parts in closed position. Fig. 3 is a section taken upon line A—B of Fig. 2. Fig. 4 is a section taken upon line C—D of Fig. 1. Fig. 5 is an elevation of the form of plug valve illustrated.

Similar numerals of reference indicate like parts in the drawings.

Plug or piston valves having packing rings exposed upon their peripheries and moved past lateral ports or openings, have been open to various objections. Perhaps the most serious are as follows: The pressure which keeps the packing rings outwardly pressed against the casings tended to press these rings still farther out when the ring was laterally unsupported, as when it passed the port opening in the casing. The port had to be made narrow laterally to avoid excessive displacement of the ring from this cause, increasing the travel for full opening. Even then, the range of materials which were capable of commercial use for these rings was very small and the materials which were used changed in properties in use so as to reduce their effective life greatly. The material of the ring was exposed to the destructive action of the blow-off elements and pressure during the time of travel past this port. Taking the directions shown in the figures, the upper edge of the port, on the opening movement of the valve, and the lower edge of the port, on the closing movement of the valve, tended to shear the excessive projection of the packing, requiring concavity of these edges toward each other to reduce the shearing effect as much as possible, still further increasing the length of travel for the required area of opening. The long travel required has resulted in so great a loss of water in the boiler before the full opening was reached that the valve was not, in fact, usually given its full opening, with resultant exposure of the packing to the destructive blow-off elements during the entire discharge. The speed of travel of the valve for its entire movement was controlled by the speed suitable for it when it was under lateral pressure, resulting in a slow movement. The packing could not be replaced while the valve was in service.

Our invention secured the advantages of the plug or piston valves without any of the disadvantages. It provides a protective casing or shield about the plug valve, supporting the packing during the movement of the latter past the lateral port and subsequently itself moved to complete the opening of the valve. This shield is itself capable of valve function, coöperating with a seat or abutment for this purpose at the same time that the interior of the shield and of the abutment form a continuous surface of uniform diameter for sealing against the packing and protecting it against the boiler content.

It will be seen that our invention is of great advantage in the protection of the packings and in shortening the stroke of plug or piston valves of an entire type of which we have illustrated but a single form.

In the form of our invention illustrated, the casing or body 1 is provided with ports 2 and 3, normally the inlet and outlet, respectively, and with adjoining flanges suitable for pipe connection. The inlet port leads to a preferably rectangular laterally directed valve opening of equal area, having a width, perpendicular to the paper in Figs. 1 and 2, of approximately the diameter of the inlet and outlet ports and a correspondingly reduced height, in the direction of travel of the valve, above the abutment or seat 5. We have shown this seat in its simplest form, as part of the casing. It may and preferably does coöperate with the cylindrical shield 6, whose interior, when the shield is down, is designed to form a continuous surface with the interior of the body adjacent to the abutment or seat. They thus afford continuous and uniform exterior sealing support for the packings of any desired interiorly located plug or piston valve, of which, in the broader aspect of our invention, the valve hereinafter described is illustrated merely as a type.

Leakage past the shield above the port is prevented by packing 7 which is held in place and compressed to its duty by stuffing box 8 and bolts and nuts 9, 10.

The shield is preferably rotatable and is advanced and retracted by a thread-and-nut connection. Its upper part is threaded at 11 and is rigidly secured within operating hand wheel 12, in order that it may be rotated within nut 13 and may be moved axially to close and open the valve. Excessive opening movement is prevented by the engagement of an annular stop 14 with the inner end of the nut.

In order that the parts may be assembled, with the construction indicated, we make the nut separate from the ring 15, in which it is supported, locking it against both rotation and longitudinal movement by any suitable means, shown as pins 16. The ring 15 is mounted upon the body of the valve and is suitably spaced from it, as by arms 17, which permit the stuffing box 8 and packing 7 to be inserted laterally, preliminarily to their axial movement to final position. This completes the structure which we prefer to use for shield and which conveniently also performs valve functions. It will be evident that it can be constructed and moved in various other ways to perform the function or functions indicated.

Within the shield 6 and abutment 5 or body of the valve we are now enabled to operate any laterally sealed plug or piston valve with any form or material of packing without danger of cutting or shearing and independent of the contour or size of the lateral port. We illustrate one such valve by the form shown at 18. Its opening at 19 is preferably a rectangle when developed, in order that it may correspond in shape and extent substantially with the opening 4 to which the port 2 leads, giving a maximum of opening for the extent of valve travel. The turn within the valve from the laterally facing opening 19 to the end opening 20, is preferably bounded by a curved wall 21 and the curve of this wall is most desirably a transition curve, reducing the transverse strain upon the side walls due to fluid impact and also reducing the extent of cross currents produced within the fluid at the time of the change of direction thereof.

The opening 20 preferably agrees in area substantially with the port 3. We have shown the piston proper as extended in the form of protecting and guide wall 22 fitting the lower part of the interior of the body in the closed position of the plug valve, but this is not essential. The parts 21 and 22 perform no sealing function. The protecting wall 22 fits and protects the interior of the body, adjacent to the abutment or seat 5, from the destructive action of the blow-off elements, when the valve is in open position; performs a steadying and guiding function as the plug valve is opened and coöperates, as hereinafter set forth, to prevent the plug from turning.

Above the valve opening, we have shown the form of plug valve to which our shield is here applied as shouldered at 23 and thereabove reduced to afford a cylindrical support for the packing rings 24 and 25, the spacing ring 26 and the follower 27. The last is pressed longitudinally against the rings to axially compress the rings 24 and 25 between the shoulder and spacing ring, and the spacing ring and follower, respectively, so as to tend to force them radially against the interior cylindrical surface within which they travel.

In the closed position of the shield, the desired continuity of interior surface causes a sealing action which may easily be made effective as a second valve and which may be rendered safe even without close fit of the shield against the abutment by the fact that the two packing rings prevent leakage in either direction of any fluid which might be forced past their junction line.

The relative longitudinal movement between the plug valve and follower may be secured in any one of many ways, of which one form only is illustrated. Here a bolt 28 engages with the upper end of the valve by means of a squared head 29, at the same time that its threaded end, by means of nuts 30 and washer 31, brings pressure upon the end 32 of the follower at 33 through the threaded sleeve 34.

The bolt can be inserted within the end of the valve by lateral movement in slot 35, before the follower and sleeve have been mounted upon the bolt, and is prevented from rotating within the valve by the angular engagement of the head of the bolt with the walls of the slot. Consequently, the axial compression of the packing rings 24 and 25, whatever their character, number and spacing, can be regulated readily while the valve is in service and without interference with the valve.

In order that the openings 4 and 19 may always register in the fully opened position of the valve, we prevent rotation of the plug valve by means, here shown as lugs or projections 36 in the body, which travel in the grooves 37 of the valve.

The non-rotatable character of the valve requires that the follower be also non-rotatable and, therefore, we prefer to make the sleeve 34 separate from the follower so that it can be rigidly connected to a hand wheel 38, as in the illustration. The sleeve 34 and nut 39 are threaded, preferably, with a relatively steep pitch in order that advantage may be taken of the freedom of the plug valve from lateral pressure to move it rapidly by means of the hand wheel.

The nut 39 is of non-circular external shape and, in the form shown, is externally threaded and is screwed into the outer end of the shield in order that it may be withdrawn to permit assemblage and removal of the plug or piston valve. This removability permits the packing to be adjusted or replaced while the shield is performing valve functions.

The form illustrated is assembled as follows:—The packing 7 and stuffing box 8 are brought into axial position by lateral movement. The ring 13 is placed upon the shield which is passed through the stuffing box and packing, after which the pins 16 are set and the stuffing box is forced into operative position. The wheel 12 may be mounted upon the shield either before or after the latter is placed in position, but after the ring 13 has been mounted upon it. The rod 28 is moved laterally to its position in the piston valve and the packing rings, spacing ring and follower are placed upon the latter. The nut 39 is screwed to position after the piston valve, follower, etc., have been placed in the shield. The wheel 38 is then mounted upon the sleeve 34 and these are screwed to position within the nut 39, after which the washer 31 and the nuts 30 are put upon the rod to bring the desired pressure upon the packing rings 24 and 25.

In operation, starting with the open position of Fig. 1, the handle 12 is turned, screwing the shield down to position, preferably upon a seat to make it effective as a valve also. It carries the piston valve along with it. Since the latter cannot turn, its opening will always be toward the opening 4 and port 2. After the shield has been seated, the piston valve is moved to place. During this movement it will be noted that the inside of the shield and the inside of the body of the casing below the shield form a continuous cylindrical surface and there is no opportunity for expansion of the packing rings 24 and 25 into any open space and, consequently, there can be no shearing strain upon them. When the valve is opened the piston valve is moved first and the packing rings are again protected against expansion into an open space and corresponding shearing strain. Subsequently, the shield, which, as indicated, also forms or may form a valve, is raised. The substantial freedom of the piston valve from lateral pressure makes it possible to move it much more rapidly than it could otherwise safely be moved, and the continuous support of the packing rings makes it possible to use a lateral port opening in the body which is very wide transversely to the axis of the piston valve and whose ends lie in planes transverse to this axis. Both of these features reduce the time of travel of the piston valve, and the character of the lateral opening in the piston valve and port reduces the length of movement of the shield since its opening can be correspondingly wide and it can have its ends in planes transverse to the axis of the valve. We thus get a shape of lateral opening and a shortness of travel in a laterally packed piston valve hitherto unattainable, and with safety impossible even with long, narrow openings.

The complete lateral support of the packing enables us to avoid the hardening in use and other changes incident to the packing now being applied to piston valves, and to use metallic and other packings which would disintegrate if subjected to the action of the blow-off elements or to the shearing action of the free valve edge. We thus make it possible to place a lubricant within the packing and to obtain any of the benefits accruing from freedom in choice.

While the piston valve, the inner valve of the structure shown is much more easily made and kept tight against leakage than the outer valve formed by the engagement of the shield with its abutment or seat, either the inner or the outer valve may be regarded as supplemental to the other and each is capable of various refinements and modifications applicable to its type.

Where the valve is to be connected "reversed," *i. e.*, with the opening 3 toward the boiler, the need of the packing 7 would be greatly reduced as there would be little pressure in the outlet port. This packing need not press much upon the shield, with the result that the handle 12 would turn more easily. In this position of the valve it is desirable that the pitch of the thread upon the sleeve 34 be not very great, lest it be forced by the pressure.

Having thus described our invention, what we claim as new and desire to secure by Letters Patent is:—

1. In a device of the character stated, a valve body having a lateral opening, a valve, packing thereon movable past the opening and a shield for the packing adapted to close the opening and, with the valve body, forming a continuous sealing wall for the packing.

2. In a device of the character stated, a valve body having two openings, a valve adapted to close one opening, packing thereon, means for distending the packing toward the other opening and a shield covering the latter opening while the packing is moved past it.

3. In a device of the character stated, a body having two openings, a closure for one opening, means for packing the closure and distending the packing toward the other opening and a closure for the second mentioned opening engaging and shielding the said packing.

4. In a device of the character stated, a valve body having port openings, one of which is lateral, a piston valve, packing thereon movable past the lateral opening, and means for protecting the packing against expansion during this movement.

5. In a device of the character stated, a valve body having port openings, two concentric valves in said body, the interior wall of one of which forms a continuous surface with the body adjacent the valve's seat, and packing upon the other valve adapted to travel along said wall and engage it.

6. In a device of the character stated, a valve body having ports, a piston valve therein, ring packing coaxial with the valve, compression means for forcing the ring packing outwardly, a combined valve and packing ring shield surrounding the piston valve and restraining the packing and means for rotating the combined shield and valve.

7. In a device of the character stated, a valve body, a nonrotatable piston valve movable therein, a rotatable inclosing shield for the piston valve, and packing coaxial with the shield and radially compressed by it during movement of the valve.

8. In a device of the character stated, a valve body, a combined shield and valve having a laterally wide opening, a piston valve therein adapted to be moved while the combined shield and valve is closed, ring packing upon the piston valve, means for compressing the ring packing axially to swell it radially to engage the shield and valve and actuating devices for rotating one valve and reciprocating the other.

9. In a device of the character stated, a valve body having a laterally directed port opening shorter in direction parallel with the axis of the valve than in width and a cylindrical bore below the port, an outer valve having a cylindrical interior corresponding to said bore, and a plug valve movable within the first valve, having a lateral opening corresponding to the port opening and extended below the lateral opening, adapted to fill the cylindrical bore when the plug valve is open and protect the edge of the bore adjacent the outer valve.

10. In a device of the character stated, a valve body having a cylindrical bore of two diameters and a valve-opening at one side of the larger part of the bore, said valve-opening being of substantially rectangular shape when developed, a shield adapted to close this valve-opening and having an interior diameter corresponding to and forming a continuous surface with the lesser diameter of the bore of the body of the valve, a plug valve within the bore of the shield, and packing therefor fitting said bore.

11. In a device of the character stated, a valve body having inlet and outlet circular openings, a longitudinal bore and an opening extending laterally from said bore and communicating with the inlet opening of shorter length axially of the bore than the diameter of the circular openings, a packing shield adapted to close the opening extending laterally from the bore, a plug valve movable within the shield and having a lateral opening and means within the bore for preventing rotation of the plug valve.

12. In a device of the character stated, a valve body, an outer cylindrical valve seated within the body, an inner plug valve fitting the bore of the outer valve and means on the plug valve for protecting the seat of the outer valve when the valves are open.

13. In a device of the character stated, an outer valve, an inner valve, reduced and laterally recessed at its upper end and movable within the outer valve, packing rings on the reduced portion of the valve capable of expansion radially against the outer valve, a spacing ring between the packing rings, a rod inserted laterally within the recess of the inner valve, a follower upon the rod, means upon the upper end of the rod for pressing the follower to compress the packing and means for moving each of the valves.

14. In a device of the character stated, a valve body, an outer valve, a piston valve movable within the outer valve, means for preventing rotation of the piston valve, an extension upon the piston valve protecting the seat of the outer valve when both are open and means for moving each of the valves.

15. In a device of the character stated, a valve body axially bored to two diameters, a piston valve having radially swelled packing thereon fitting the smaller bore of the body, means for adjusting the pressure upon the packing from the outside of the valve and a cylindrical shield surrounding the piston valve, fitting the larger bore of the body and having its interior of diameter equal to that of the smaller bore of the body.

16. In a device of the character stated, a valve body having a laterally directed port opening, shorter in direction of the travel of the valve than transversely thereto, a cylindrical bore above the port, and a cylindrical bore below the port, an outer valve having a cylindrical interior corresponding to the bore above the port, and a plug valve engaging the walls of and movable within the first valve and the bore below the port.

17. In a device of the character stated, a valve body, a piston valve movable therein, a rotatable inclosing shield for the piston valve, a seat with which said shield coöperates and radially expanded packing co-axial with the valve and the shield compressed by the shield in one position of the valve.

18. In a device of the character stated, a valve body having end and side openings and a cylindrical bore between, a plug valve movable in said bore, spaced packings axially in line with said bore, and a movable shield co-axial with the valve maintaining one packing in radial compression at all times and the other packing in compression in one position of the valve.

19. In a device of the character stated, a valve body having inlet and outlet openings and a longitudinal bore, a plug valve fitting said bore, a shield movable co-axially in line with the valve, and packing coöperating with the body, valve and shield so that a continuous uniform surface is presented radially compressing the packing at all times.

20. In a device of the character stated, a valve body having inlet and outlet openings and bored longitudinally, packing co-axial with the bore, and a shield and a valve movable axially of the bore and coöperating with the bore to maintain constant radial pressure upon the packing while the passage between the openings is being opened and closed.

21. In a device of the character stated, a valve body having inlet and outlet circular openings, a longitudinal bore and an opening extending laterally from said bore and communicating with the inlet opening, a shield adapted to close the opening extending laterally from the bore, packing radially compressed by said shield and a plug valve movable within the shield.

THOMAS M. EYNON.
JOHN V. SCHMID.

Witnesses:
F. E. SCHULTE,
F. L. HUEGLE.